US010686712B2

(12) United States Patent
Takajo et al.

(10) Patent No.: US 10,686,712 B2
(45) Date of Patent: Jun. 16, 2020

(54) COMMUNICATION APPARATUS, CONTROL APPARATUS, COMMUNICATION SYSTEM, RECEIVED PACKET PROCESSING METHOD, COMMUNICATION APPARATUS CONTROL METHOD, AND PROGRAM

(71) Applicant: NEC CORPORATION, Tokyo (JP)

(72) Inventors: Mamoru Takajo, Tokyo (JP); Yoji Suzuki, Tokyo (JP); Masanori Takashima, Tokyo (JP)

(73) Assignee: NEC Corporation, Tokyo (JP)

( * ) Notice: Subject to any disclaimer, the term of this patent is extended or adjusted under 35 U.S.C. 154(b) by 138 days.

(21) Appl. No.: 15/307,933

(22) PCT Filed: Apr. 30, 2015

(86) PCT No.: PCT/JP2015/062962
§ 371 (c)(1),
(2) Date: Oct. 31, 2016

(87) PCT Pub. No.: WO2015/166979
PCT Pub. Date: Nov. 5, 2015

(65) Prior Publication Data
US 2017/0054647 A1 Feb. 23, 2017

(30) Foreign Application Priority Data
May 1, 2014 (JP) ................................. 2014-094392

(51) Int. Cl.
*H04L 12/823* (2013.01)
*H04L 29/06* (2006.01)
(Continued)

(52) U.S. Cl.
CPC ............ *H04L 47/323* (2013.01); *H04L 47/25* (2013.01); *H04L 69/22* (2013.01); *H04L 45/64* (2013.01)

(58) Field of Classification Search
None
See application file for complete search history.

(56) References Cited

U.S. PATENT DOCUMENTS

| 7,987,359 B2 | 7/2011 | Kawano et al. |
| 8,509,252 B2 | 8/2013 | Chiba et al. |
(Continued)

FOREIGN PATENT DOCUMENTS

| CN | 1901512 A | 1/2007 |
| CN | 100539550 C | 9/2009 |
(Continued)

OTHER PUBLICATIONS

Office Action dated Nov. 13, 2017, issued by the Russian Patent Office in Russian Patent Application No. 2016145682/08(073227).
(Continued)

*Primary Examiner* — Hassan A Phillips
*Assistant Examiner* — Gautam Sharma
(74) *Attorney, Agent, or Firm* — Finnegan, Henderson, Farabow, Garrett & Dunner, L.L.P.

(57) ABSTRACT

A communication apparatus comprises a packet reception notifying unit that, when receiving predetermined packets, transmits to a predetermined control apparatus a packet reception notification, wherein the packet reception notification indicates that the predetermined packets have been received. Regarding a packet specified by the control apparatus among the predetermined packets, the communication apparatus performs predetermined transmission restraint control of the packet reception notification.

8 Claims, 8 Drawing Sheets (51) Int. Cl.
*H04L 12/825* (2013.01)
*H04L 12/715* (2013.01)

(56) References Cited

U.S. PATENT DOCUMENTS

| | | |
|---|---|---|
| 8,588,072 B2 | 11/2013 | Ueno |
| 8,842,673 B2 | 9/2014 | Akiyoshi |
| 8,842,674 B2 | 9/2014 | Akiyoshi |
| 9,203,754 B2 | 12/2015 | Akiyoshi |
| 9,231,868 B2 | 1/2016 | Akiyoshi |
| 9,246,815 B2 | 1/2016 | Torigoe |
| 9,258,220 B2 | 2/2016 | Chiba et al. |
| 2004/0228273 A1 | 11/2004 | Kurobe et al. |
| 2007/0022195 A1 | 1/2007 | Kawano et al. |
| 2007/0201462 A1 | 8/2007 | Ilan |
| 2011/0307628 A1 | 12/2011 | Chiba |
| 2012/0008629 A1 | 1/2012 | Chiba et al. |
| 2012/0020361 A1 | 1/2012 | Ueno |
| 2013/0010803 A1* | 1/2013 | Yamaguchi ............ H04L 69/22 370/408 |
| 2013/0064243 A1 | 3/2013 | Akiyoshi |
| 2013/0163426 A1* | 6/2013 | Beliveau ............ H04L 67/327 370/235 |
| 2013/0223442 A1* | 8/2013 | Narayanan ............ H04L 45/64 370/389 |
| 2013/0235869 A1 | 9/2013 | Akiyoshi |
| 2013/0308650 A1 | 11/2013 | Chiba et al. |
| 2014/0233577 A1 | 8/2014 | Hatano et al. |
| 2014/0241349 A1* | 8/2014 | Yoon ............ H04L 47/10 370/389 |
| 2014/0247725 A1 | 9/2014 | Torigoe |
| 2014/0348171 A1 | 11/2014 | Akiyoshi |
| 2014/0348172 A1 | 11/2014 | Akiyoshi |
| 2015/0078385 A1* | 3/2015 | Shelly ............ H04L 45/38 370/392 |
| 2015/0103824 A1* | 4/2015 | Tanabe ............ H04L 65/4076 370/390 |
| 2015/0117202 A1* | 4/2015 | Bhagavathiperumal .................... H04L 47/10 370/235 |
| 2015/0156107 A1* | 6/2015 | Li ............ H04L 45/18 370/230 |
| 2015/0350085 A1* | 12/2015 | Soumiya ............ H04L 45/125 370/232 |
| 2016/0065471 A1 | 3/2016 | Akiyoshi |

FOREIGN PATENT DOCUMENTS

| | | |
|---|---|---|
| EP | 1887741 A1 | 2/2008 |
| KR | 10-2006-0015254 | 2/2006 |
| RU | 2364040 C2 | 8/2009 |
| WO | WO 2011/030462 A1 | 3/2011 |
| WO | WO 2011/083682 | 7/2011 |
| WO | WO 2011/115168 | 9/2011 |
| WO | WO 2012/070173 A1 | 5/2012 |
| WO | WO 2013/046706 A1 | 4/2013 |
| WO | WO 2013/051386 A1 | 4/2013 |

OTHER PUBLICATIONS

OpenFlow Switch Specification, Version 1.1.0 Implemented (Wire Protocol 0x02), pp. 1-56, Feb. 2011.
N. McKeown et al., "OpenFlow: Enabling Innovation in Campus Networks", Mar. 2008.
International Search Report and Written Opinion dated Jun. 30, 2015, in corresponding PCT International Application.
Daisuke Kotani et al., "Packet-In Message Control for Reducing CPU Load and Control Traffic in OpenFlow Switches", 2012 European Workshop on Software Defined Networking, pp. 42-47, Oct. 25, 2012.
Extended European Search Report dated Nov. 24, 2017 in counterpart European Application No. EP 15786524.
First Office Action dated Sep. 30, 2018, issued by the Chinese National Intellectual Property Administration in Chinese Patent Application No. 201580021686.5.
Notification of Reasons for Refusal dated Jun. 1, 2018, issued by the Korean Intellectual Property Office in Korean Patent Application No. 10-2016-7033426.

* cited by examiner

| MATCHING CONDITION | ACTION |
|---|---|
| ... | ... |
| DESTINATION MAC ADDRESS : xxx | Packet-In(100pps) |
| ANY | Packet-In(NO CONDITION) |
| ... | ... |

PRIORITY HIGH ←———————————————→ LOW

FIG. 5

| MATCHING CONDITION | ACTION |
|---|---|
| ... | ... |
| Protocol #89, OSPF Type=1, ... | Packet-In(100pps, WRED) |
| ANY | Packet-In(NO CONDITION) |
| ... | ... |

PRIORITY: HIGH ↔ LOW

COMMUNICATION APPARATUS, CONTROL APPARATUS, COMMUNICATION SYSTEM, RECEIVED PACKET PROCESSING METHOD, COMMUNICATION APPARATUS CONTROL METHOD, AND PROGRAM

REFERENCE TO RELATED APPLICATION

This application is a National Stage Entry of International Application No. PCT/JP2015/062962, filed Apr. 30, 2015, which is based upon and claims the benefit of the priority of Japanese patent application No. 2014-094392, filed on May 1, 2014. The entire contents of the above-referenced applications are expressly incorporated herein by reference.

TECHNICAL FIELD

The present invention relates to a communication apparatus, a control apparatus, a communication system, a received packet processing method, a communication apparatus control method, and a program. In particular, it relates to: a communication apparatus that transmits to a control apparatus a notification of an unknown received packet; a control apparatus; a communication system; a received packet processing method; a communication apparatus control method; and a program.

BACKGROUND

A centralized control network such as OpenFlow described in Non-Patent Literatures 1 and 2 is known. It is known that, when load is concentrated on a control apparatus (controller) in the centralized control network, setting necessary control information (flow entries) would be delayed, which makes communications to be unable to be performed, otherwise, traffics to be blocked will keep flowing in the control apparatus.

Patent Literature 1 discloses a configuration that decreases the load on the controller, by decreasing the number of inquiries of flow entries (a "Packet-In message" described in Non-Patent Literature 2), where the inquiries of the flow entries are causes of increases in the load on the controller. Specifically, a switch described in Patent Literature 2 stacks packets that have caused the controller to inquire the flow entries, then, the switch controls to forward a packet that includes same header information as that of the stacked packets until the flow entries are set. In this process, if being configured to cause a broadcast to be performed for the packet including same header information as that of the stacked packets, it is possible to realize a communication until the flow entries are set.

Patent Literature 2 discloses a configuration comprising, when an existing flow entry is changed to another flow entry that generates an inquiry of the existing flow entry, predicting load on the controller caused by this change, then, dividing (subdividing) the existing flow entry when the load exceeds an allowable value.

Patent Literature 3 discloses a configuration comprising embedding processing contents into a packet, wherein the processing contents are applied to the packet, in order to decrease a number of inquiries of the flow entries.
Patent Literature 1
International Publication No. WO2013/051386 A1
Patent Literature 2
International Publication No. WO2011/083682 A1
Patent Literature 3
International Publication No. WO2011/115168 A1
Non-Patent Literature 1
Nick McKeown, and seven others, "OpenFlow: Enabling Innovation in Campus Networks", [online], [searched on Apr. 7, 2014], Internet <URL: http://archive.openflow.org/documents/openflow-wp-latest.pdf>
Non-Patent Literature 2
"OpenFlow Switch Specification" Version 1.1.0 Implemented (Wire Protocol 0x02), [online], [searched on Apr. 7, 2014], Internet <URL:http://archive.openflow.org/documents/openflow-spec-v1.1.0.pdf>

SUMMARY

The following analysis has been given by the present inventor. In the centralized control network described above, a communication apparatus (a switch) sometimes repeats receiving a same packet. However, due to intervals of receiving the packet, the packet could be dropped on the communication apparatus (switch), then, there could be a situation where little of, or none of the packet go to the control apparatus (controller).

Such situation described above can occur because of a limitation on processing ability for inquiry messages of flow entries which the communication apparatus (switch) can transmit to the control apparatus (controller). Also, as described in Patent Literature 1, the above situation can occur, when there is implemented a function on the communication apparatus (switch), wherein the function for which controls forwarding a packet that includes a same header information as that of the stacked packets.

On the other hand, the present inventor has focused on a point that there is no need to transmit to the control apparatus (controller) some particular packets among packets dropped on the communication apparatus (switch). A GARP (Gratuitous ARP (Address Resolution Protocol)) packet, and a keep alive packet/an advertising packet/a Hello packet can be used as the particular packets. For example, although the keep alive packet/the advertising packet/the Hello packet are used on the control apparatus (controller) to detect a topology, it can be considered that it is not necessary to transmit all of these packets to the control apparatus (controller). Also, it can be considered that it is not necessary to transmit to the control apparatus (controller) all of packets for transmitting sensor data with respective types, packets relating to a video data, and packets for observing communications, etc.

Further, suppressing the inquiry messages of the flow entries by receiving the particular packets contributes to decreasing the load on the control apparatus (controller).

There is a need in the art to contribute to enriching methods suppressing transmission of the inquiry messages of the flow entries.

According to a first aspect, there is provided a communication apparatus, comprising: a packet reception notifying unit that, when receiving predetermined packets, transmits to a predetermined control apparatus a packet reception notification, wherein the packet reception notification indicates that the predetermined packets have been received. Regarding a packet specified by the control apparatus among the predetermined packets, the communication apparatus performs predetermined transmission restraint control of the packet reception notification.

According to a second aspect, there is provided a control apparatus, adapted to communicate with a communication apparatus(es), the communication apparatus(es) comprising a packet reception notifying unit that, when receiving predetermined packets, transmits to a predetermined control apparatus a packet reception notification, wherein the packet reception notification indicates that the predetermined packets have been received, the control apparatus comprising: means for notifying a target packet for which transmission restraint of the packet reception notification is performed, and contents of transmission restraint control applied to the target packet. Regarding the target packet, the control apparatus causes the communication apparatus(es) to perform transmission restraint of the packet reception notification in accordance with the contents of the transmission restraint control.

According to a third aspect, there is provided a communication system, comprising: a communication apparatus(es) comprising a packet reception notifying unit that, when receiving predetermined packets, transmits to a predetermined control apparatus a packet reception notification, wherein the packet reception notification indicates that the predetermined packets have been received, and a control apparatus; the control apparatus comprising: means for notifying, to the communication apparatus(es), a target packet for which transmission of the packet reception notification is restrained, and contents of the transmission restraint control; wherein, as for the target packet, the control apparatus causes the communication apparatus(es) to perform transmission restraint of the packet reception notification in accordance with the contents of the transmission restraint control.

According to a fourth aspect, there is provided a received packet processing method, used in a communication apparatus(es), comprising: a packet reception notifying unit that, when receiving a predetermined packet, transmits to a predetermined control apparatus a packet reception notification, wherein the packet reception notification indicates that the predetermined packet has been received. The received packet processing method comprises checking whether or not the predetermined packet corresponds to the packet specified by the control apparatus; and performing transmission restraint control of the packet reception notification, wherein the transmission restraint control by which transmission restraint of the packet reception notification to the control apparatus is performed, when the predetermined packet corresponds to the packet specified by the control apparatus. This method is associated with a specific machine(s), namely, with the communication apparatus(es) that transmits to a predetermined control apparatus a packet reception notification, wherein the packet reception notification indicates that the predetermined packets have been received.

According to a fifth aspect, there is provided a communication apparatus control method, used in a control apparatus that receives a packet reception notification, wherein the packet reception notification indicates that the predetermined packet has been received from a communication apparatus(es). The communication apparatus control method comprises: notifying a target packet to the communication apparatus(es), wherein the target packet for which transmission of the packet reception notification is restrained, and contents of the transmission restraint control applied to the target packet; and as for the target packet, receiving the packet reception notification from the control apparatus in accordance with the contents of the transmission restraint control. This method is associated with a specific machine(s), namely, with the control apparatus that performs the transmission restraint control of the packet reception notification to the communication apparatus(es).

According to a sixth aspect, there is provided a non-transitory computer readable recording medium storing a program for realizing functions of the communication apparatus(es) and the control apparatus. This program can be recorded in a computer-readable (non-transient) storage medium. Namely, the present invention can be embodied as a computer program product.

The present invention can contribute to enriching methods suppressing transmission of the inquiry messages of the flow entries.

PREFERRED MODES

In the present disclosure, there are various possible modes, which include the following, but not restricted thereto. First, an outline of an exemplary embodiment of the present invention will be described with reference to the drawings. In the following outline, various components are denoted by reference characters for the sake of convenience. Namely, the following reference characters are merely used as examples to facilitate understanding of the present invention, not to limit the present invention to the illustrated modes.

Figure 1:
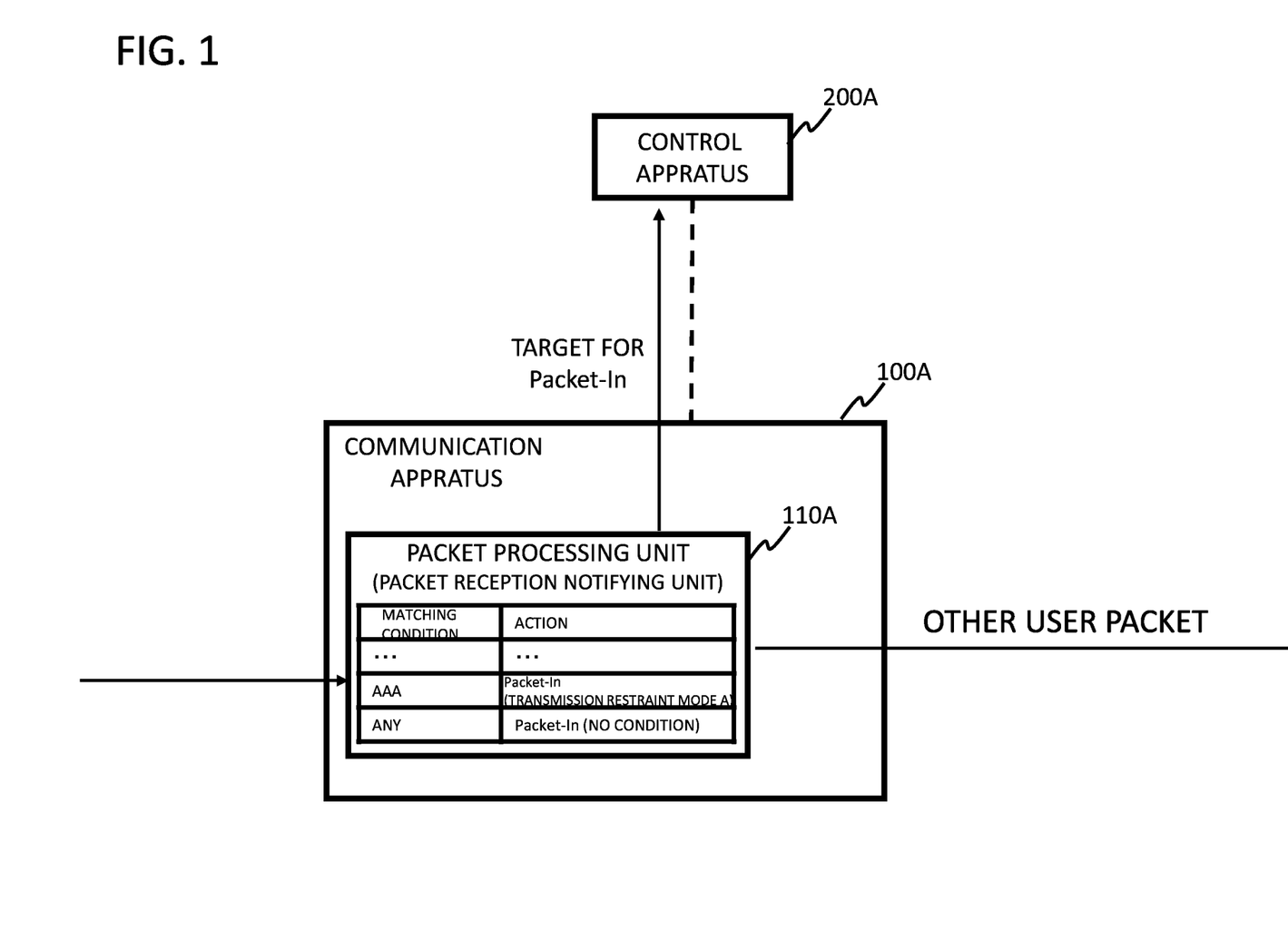
FIG. 1 illustrates a configuration according to an exemplary embodiment of the present invention.

As illustrated in FIG. 1, an exemplary embodiment of the present invention can be realized by a communication apparatus 100A, that comprises a packet processing unit 110A, and a control apparatus 200A that controls the communication apparatus 100A.

More specifically, the packet processing unit 110A of the communication apparatus 100A that functions as a packet reception notifying unit that, when receiving predetermined packets, transmits to a predetermined control apparatus a packet reception notification, wherein the packet reception notification indicates that the predetermined packets have been received. Furthermore, as for a packet specified by the control apparatus among the predetermined packets, the packet processing unit 110A performs predetermined transmission restraint control of the packet reception notification. A method known as one of methods among limiting a transmission rate (so-called, rate limitation), packet sampling, traffic shaping, and packet dropping, or a combination of these methods is available as contents of the predetermined transmission restraint control, but the contents of the predetermined transmission restraint control is not limited to such methods.

It is preferred that it is possible to instruct from a control apparatus 200A a target packet for the transmission restraint control on the communication apparatus 100A and the contents of the transmission restraint control. For example, the control apparatus 200A notifies to the communication apparatus 100A the target packet for which transmission of the packet reception notification (a matching condition AAA in a table in the packet processing unit 110A shown in FIG. 1) is restrained, and the contents of the transmission restraint control applied to the target packet ("a transmission restraint mode A" in the table).

By configuring as described above, it can be realized that the communication apparatus 100A performs the transmission restraint control corresponding to the inquiry messages (the packet reception notifications) of flow entries. Also, the transmission restraint of the inquiry messages (the packet reception notifications) of the flow entries contributes to decreasing load on the control apparatus 200A. Further, the keep alive packet or the advertising packet/the Hello packet, etc. for which dropping some of packets are allowed are available as the target packet for the transmission restraint control.

First Exemplary Embodiment

Figure 2:
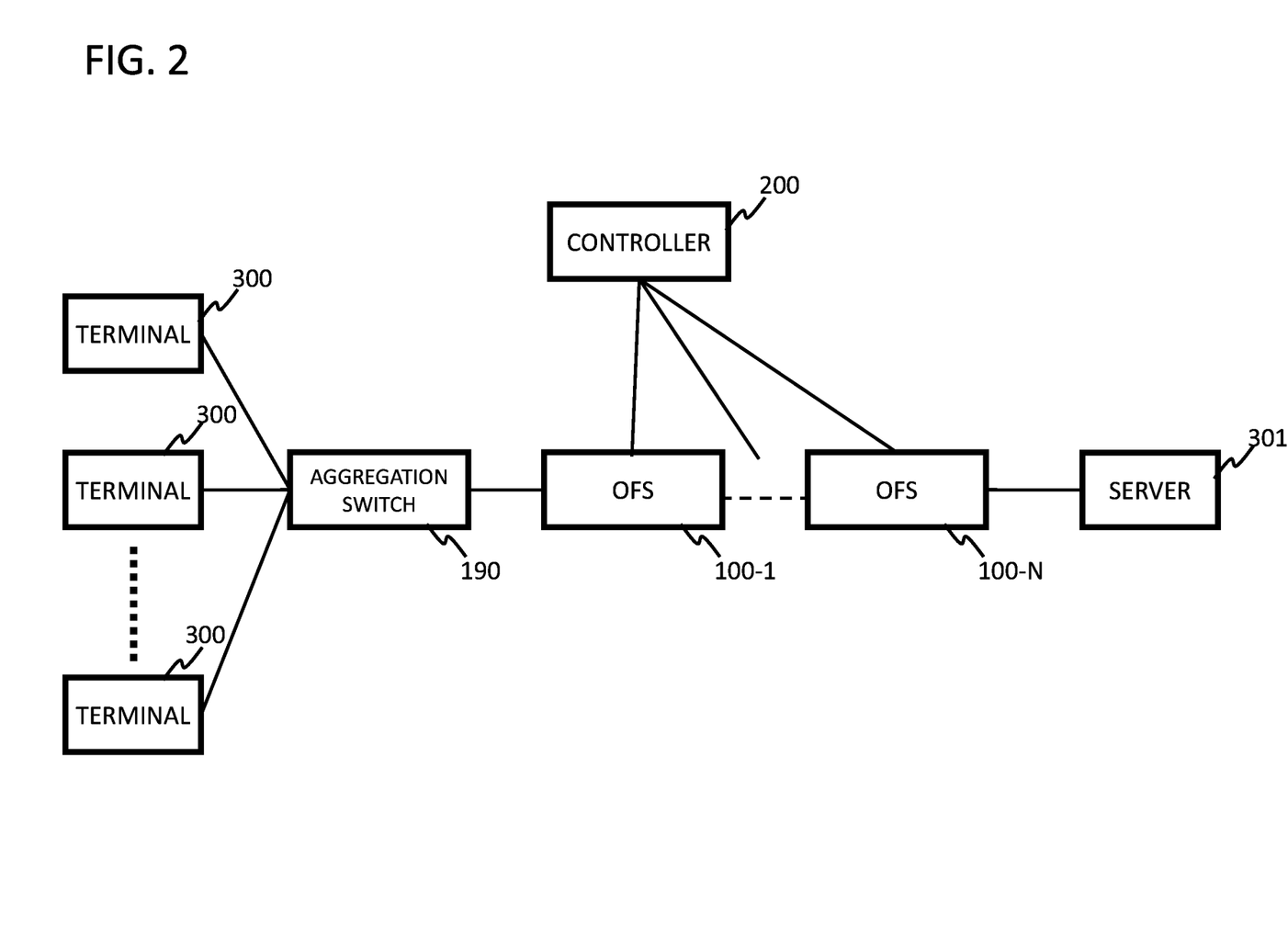
FIG. 2 illustrates a configuration of a communication system according to an first exemplary embodiment of the present invention.

Next, a first exemplary embodiment of the present invention will be described in detail with reference to the drawings. FIG. 2 illustrates a configuration of a communication system according to the first exemplary embodiment of the present invention. FIG. 2 shows the configuration that comprises a connection between an aggregation switch 19 and a server 301 via OpenFlow switches (referred to as OFSs) 100-1 to 100-N, wherein the aggregation switch 190 is connected to a plurality of terminals. A controller 200 can realize communications by setting flow entries for causing packets between a terminal 300 and the server 301 to be forwarded to the OFSs 100-1 to 100-N. Note that, the terminal(s) 300 and the server 301 are merely examples of subjects of the communications, they can be replaced with various types of other devices (for example, it may be a virtual machine (VM) operated in a virtual server, or a sensor device of an M2M (Machine to Machine) system).

Figure 3:
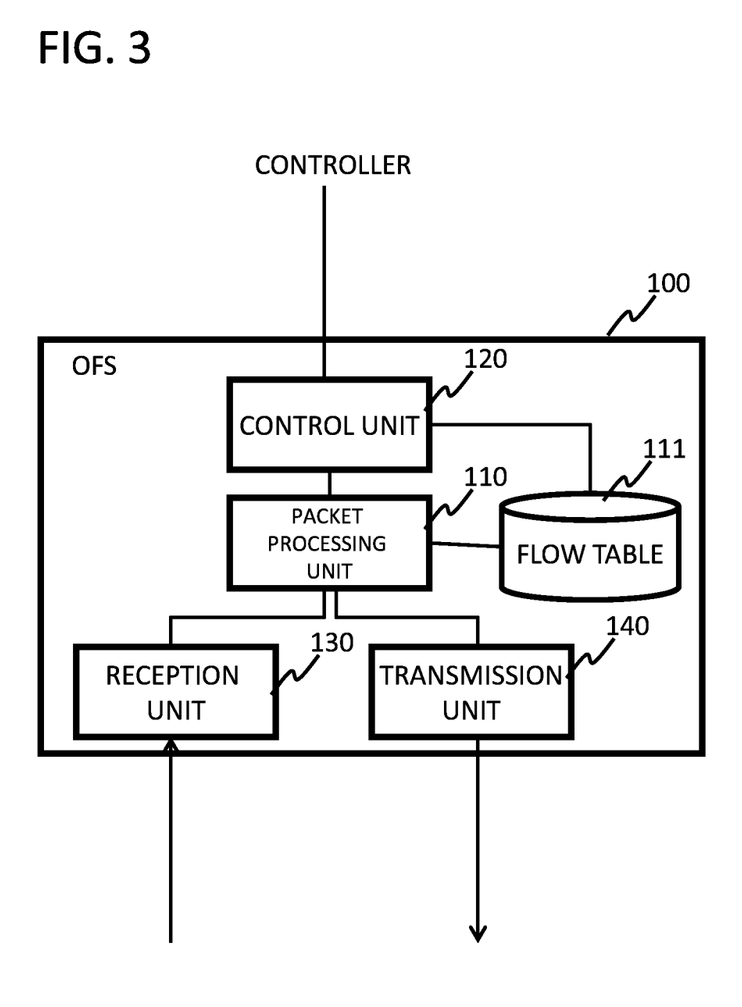
FIG. 3 illustrates a configuration of an OpenFlow switch (OFS) according to the first exemplary embodiment of the present invention.

FIG. 3 illustrates a diagram of a configuration of the OFSs 100-1 to 100-N (in the following, referred to as OFS 100, when there is no need to distinguish the respective OFSs). FIG. 3 shows a configuration comprising a control unit 120, a packet processing unit 130, a flow table 111, a reception unit 130, and a transmission unit 140.

The control unit 120 performs transmitting and receiving a control message between the controller 200 and the control unit 120. When the control unit 120 receives an instruction (for example, a FlowMod message described in Non-Patent Literature 2) for an entry setting etc. from the controller 200, the control unit 120 performs adding, changing, deleting etc. a flow entry(es) instructed from the controller 200 for the flow table 111.

When the packet processing unit 110 receives a packet via the reception unit 130, the packet processing unit 110 searches from the flow table an entry(es) including a matching condition that matches the received packet. As a result of searching, when the packet processing unit 110 has found the entry(es) including the matching condition that matches the received packet, the packet processing unit 110 processes the received packet in accordance with processing contents (addition to forwarding, dropping, rewriting a header etc., notifying a packet reception to the conditioned controller proposed in the present specification) defined in an action field(s) in the entry(es). For example, when the received packet is transmitted from the terminal(s) 300 to the server 301, the packet processing unit 100 finds out the entry(es) for processing the received packet from the flow table 111, then, outputs the received packet from the transmission unit 140 in accordance with contents of the found entry(es).

Figure 4:
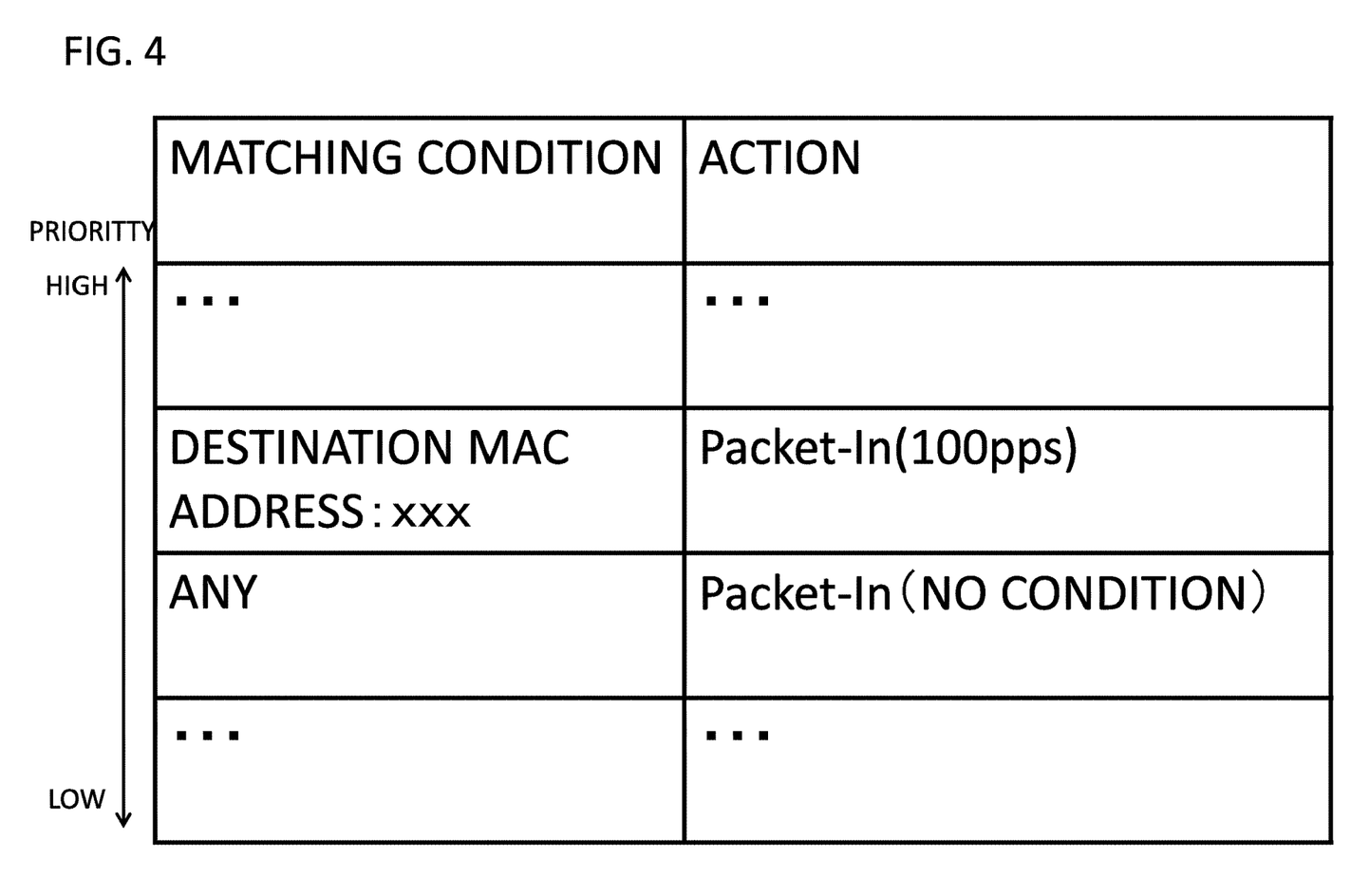
FIG. 4 illustrates an example of entries that are set in a flow table on the OFS according to the first exemplary embodiment of the present invention.

Here, details of the entries that are set in the flow table 111 on the OFS 100-1 described in FIG. 2 (the OFS whose location is a port in which many traffics flow) will be described. FIG. 4 illustrates an example of the entries that are set in the flow table 111 on the OFS 100-1. The entry described in FIG. 4 including the matching condition=a destination address: xxx and an action (the processing contents)=Packet-In (100 pps) corresponds to an entry for causing the OFS 100-1 to notify the packet reception to controller 200 with rate limitation. In this case, when receiving a control target packet whose destination is xxx, the packet processing unit 110 notifies the packet reception to the controller under a condition with 100 pps (Packet per Second).

Further, in the case of an example shown in FIG. 4, when other packet with a low priority than that of the above entry(es) (the matching condition=ANY) has been received, there is an entry(es) that causes the controller 200 to notify the packet reception (a Packet-In message). For example, the entry(es) is used for detecting a new communication between the terminal 300 and the server 301. Further, in the case of an example shown in FIG. 4, as the entry(es) is stored at an upper position, the entry(es) has a higher priority, but it is possible to realize a such priority control by including priority information in the respective entry(es). Also, in the case of an example shown in FIG. 4, entry(es) for realizing a known communication between the terminal 300 and the server 301 is omitted, but the entry(es) have normally a higher priority than that of entry(es) for performing to notify the packet reception.

Figure 5:
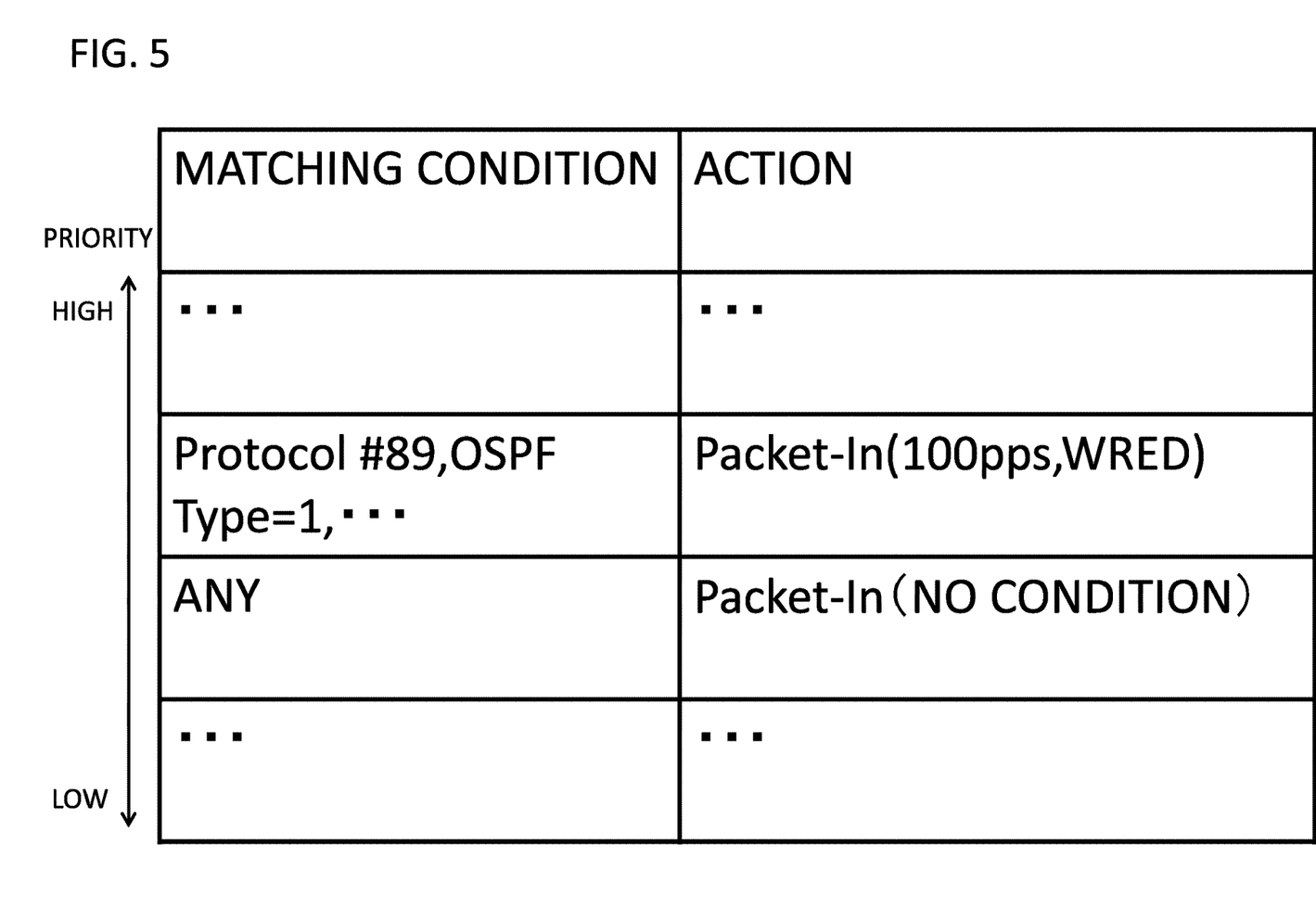
FIG. 5 illustrates another example of the entries that are set in the flow table on the OFS according to the first exemplary embodiment of the present invention.

FIG. 5 illustrates an example of other entries that are set in the flow table on the OFS 100-1. An entry described in FIG. 5 including the matching condition=Protocol #89; an OSPF Type=1; and an action (the processing contents)=Packet-In (100 pps, a WRED) is for notifying a packet reception with rate limitation to the controller 200. A target of the matching condition including the Protocol #89 and the OSPF Type=1 is a Hello packet of the OSPF (Open Shortest Path First). Further, the Packet-In (100 pps and the WRED) in the action (the processing contents) means that notifying the packet reception to the controller 200 is performed under a condition with 100 pps and the WRED (Weighted Random Early Detection).

Further, the mode of the transmission restraint control of the packet reception notification to the controller 200 is not limited to the above method that uses pps and the WRED, but it is possible to use a broadband control method, or a congestion control method that is different from the above method but can be performed at the side of the OFS 100. Also, the mode of a transmission limitation for the packet reception notification may not be described in the respective entries, but may define default processes for respective controlled packets in the OFS. For example, similar control can be realized by determining that 100 pps is applied to the Hello packet of the OSPF, and determining that 50 pps is applied the keep alive packet.

Figure 6:
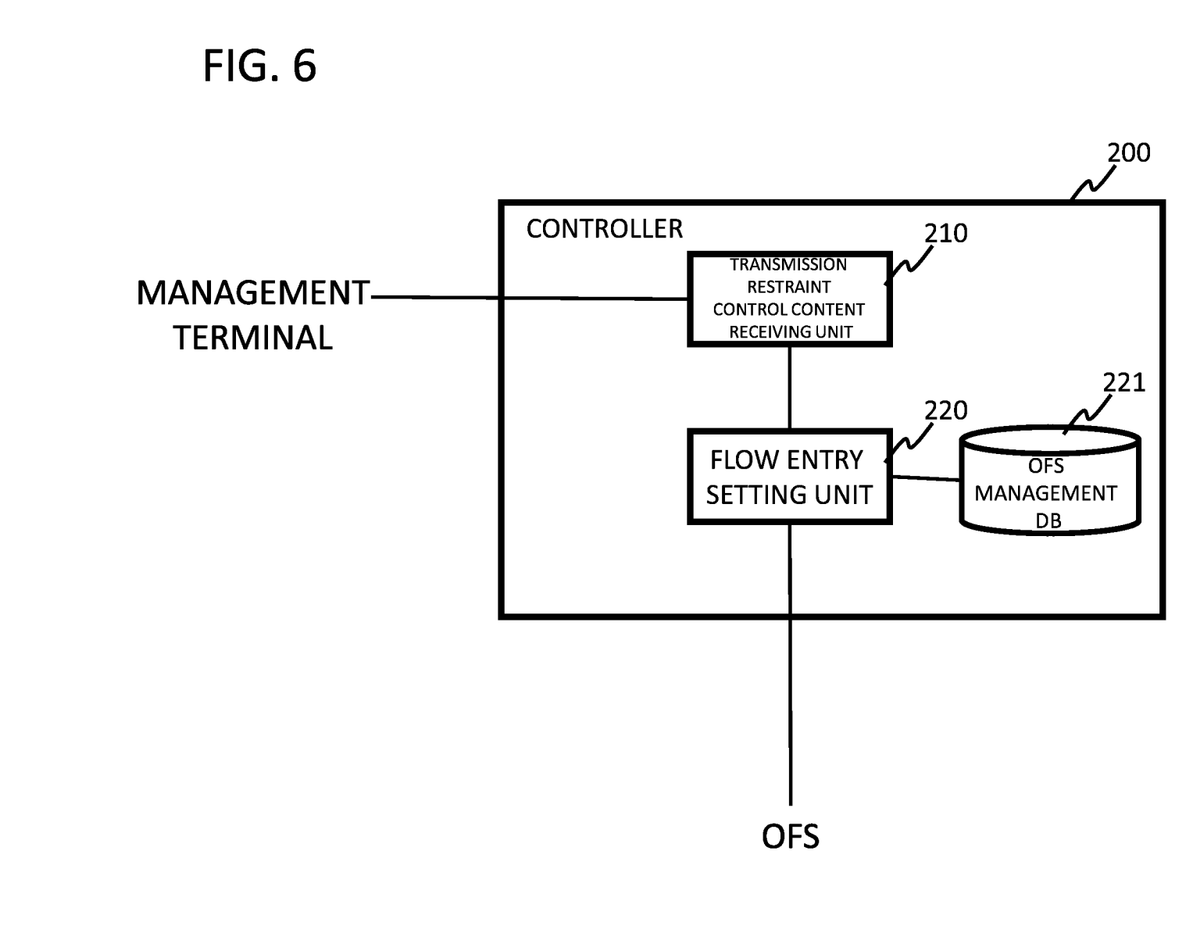
FIG. 6 illustrates a configuration of a controller according to the first exemplary embodiment of the present invention.

Next, details of the configuration of the controller 200 that sets the entries shown in FIGS. 4 and 5 will be described. FIG. 6 illustrates the configuration of the controller 200 according to the first exemplary embodiment of the present invention. FIG. 6 shows a configuration comprising a transmission restraint control contents receiving unit 210, a flow entry setting unit 220, and an OFS management database (referred to as OFS management DB) 221.

The transmission restraint control contents receiving unit 210 receives from a network manager the target packet for which transmission of the packet reception notification is restrained, and the contents of the transmission restraint control via a management terminal etc., then, notifies them to the flow entry setting unit 220. Further, when performing these processes, the OFS that performs the transmission restraint control may be notified from the network manager to the transmission restraint control contents receiving unit 210.

Based on the contents of the notification transmitted from the transmission restraint control contents receiving unit 210, the flow entry setting unit 220 generates a setting entry(es) for setting the flow table 111 on the OFS 100, wherein the setting entry(es) that associates the target packet for which transmission of the packet reception notification is restrained, with the contents of the transmission restraint control applied to the target packet. Then, the flow entry setting unit 220 sets them to the corresponding OFS 100. Therefore, the flow entry setting unit 220 corresponds to a means that notifies the target packet for which transmission of the packet reception notification is restrained, and the contents of the transmission restraint control applied to the target packet.

The OFS management DB 221 stores the entry(es) that has been set in the flow table on the respective OFSs. The flow entry setting unit 220 refers to the OFS management DB 221, then, determines (checks) whether or not to generate the setting entry(es) for setting the flow table 111. The OFS management DB 221 may store network topology information, terminal information regarding connection to the OFS, etc. other than the above entry(es). In this case, an OFS management unit (not shown in drawings) updates the above stored information in the OFS management DB 221 by using the received packet from the OFS, wherein the received packet includes the target packet for the transmission restraint control.

Note that, the components (processing means) and functions of the communication apparatus(es), the control apparatus, the OFSs, and the controller shown in FIGS. 1, 2 and 6 can be realized by computer programs that cause computers mounted on these apparatuses to use hardware thereof and to perform the respective processes.

Figure 7:
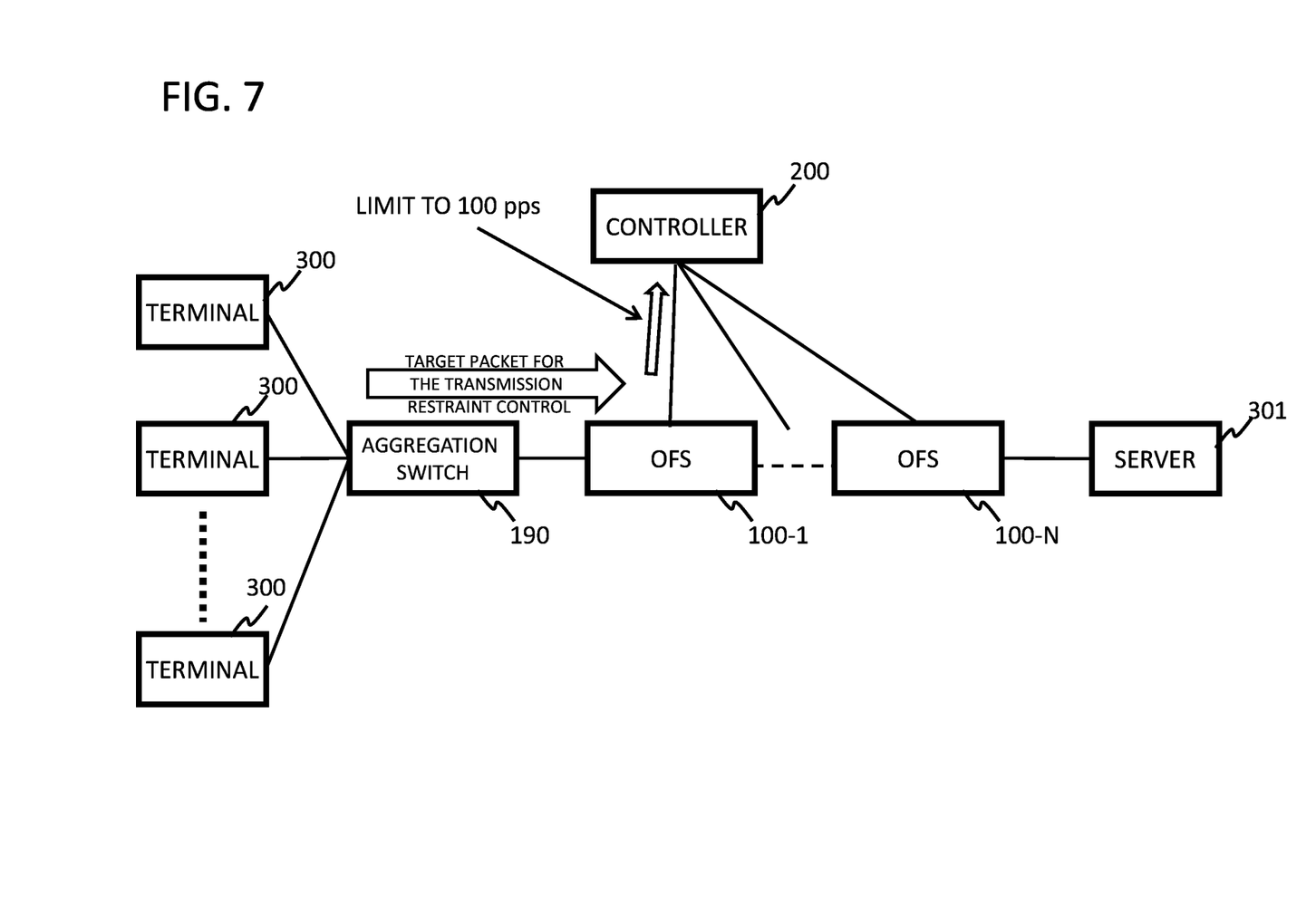
FIG. 7 illustrates a processing flow for explaining operations of the first exemplary embodiment of the present invention.

Next, an operation according to the present exemplary embodiment will be described in detail with reference to the drawings. As illustrated in FIG. 7, many packets transmitted from a plurality of the terminals 300 can reach at the OFS 100-1 via the aggregation switch 190.

As described above, an entry(es) that associates the target packet, of which is a target for the transmission restraint of the packet reception notification, with the contents of the transmission restraint control applied to the target packet are set in the flow table 111 on the OFS 100-1 (refer to FIGS. 4 and 5). Therefore, the OFS 100-1 transmits the packet reception notification to the controller 200 by applying predetermined contents of the transmission restraint control (for example, 100 pps) to the target packet for the transmission restraint of the packet reception notification (refer to FIG. 7). Note that, since the target packet for the transmission restraint control is used as the keep alive packet, the advertising packet/the Hello packet, etc., even if some packets are dropped, a severe problem will not occur.

Figure 8:
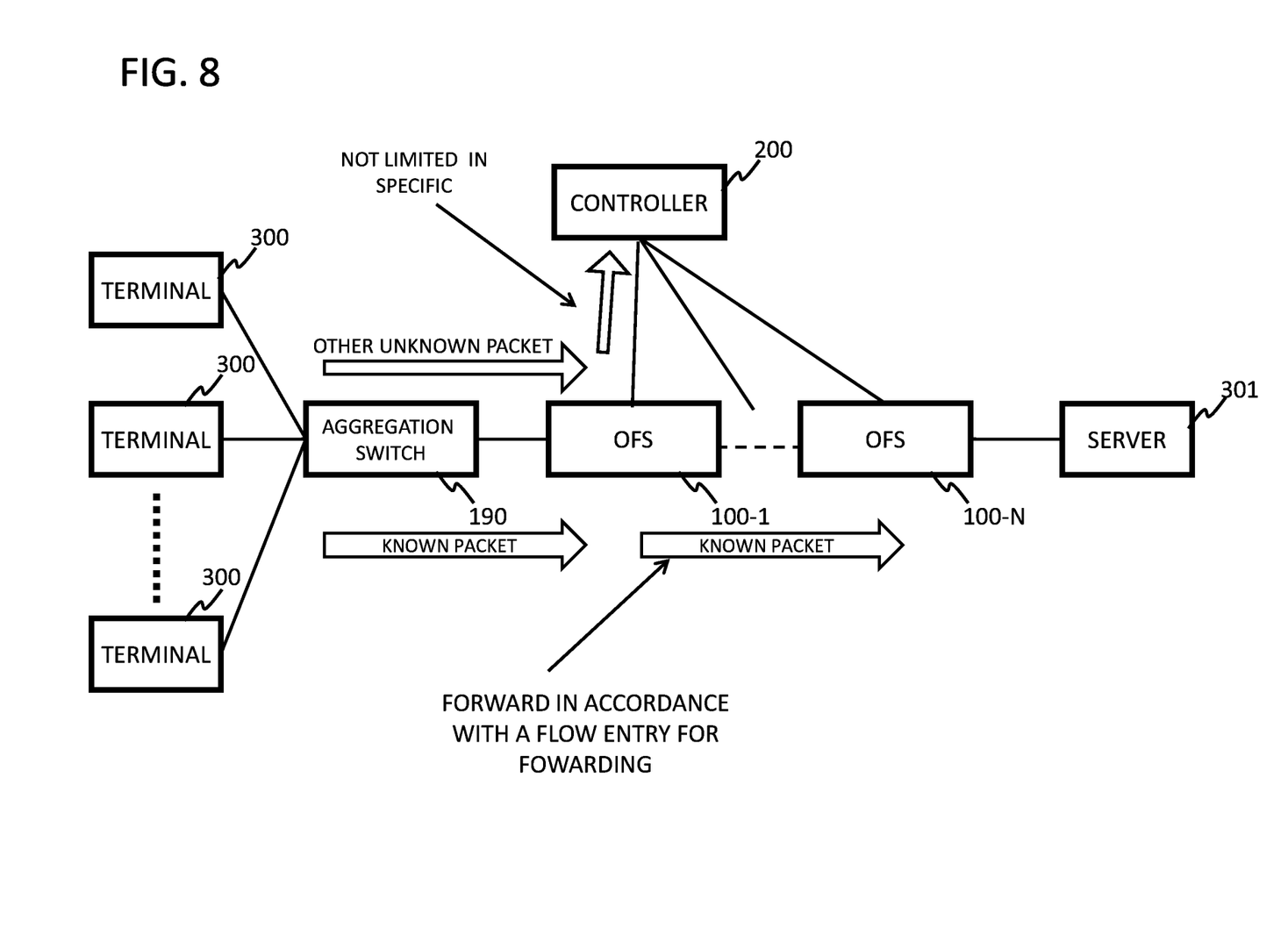
FIG. 8 illustrates a processing flow for explaining the operation of the first exemplary embodiment of the present invention.

On the other hand, the OFS 100-1 also receives a communication packet (a unknown packet) that is newly generated between the terminal 300 and the server. Regarding packets other than a target of the transmission restraint of the packet reception notification, the OFS 100-1 transmits a reception notification to the controller without performing any of the transmission restraint control (refer to FIG. 8). By performing this process, the controller 200 can exactly recognize a generation of a new communication. When the controller 200 receives the packet reception notification, the controller 200 determines that there is the new communication between the terminal 300 and the server, then, sets an entry(es) (a flow entry(es) for forwarding) to the flow table 111 to cause a packet between the terminal 300 and the server to be forwarded to the OFS 100 on a path. After this process, the packet between the terminal 300 and the server is forwarded as a known packet (refer to FIG. 8).

As described above, in the present exemplary embodiment, it is possible to select a packet for which the transmission of the packet reception notification to the controller is performed, and perform the transmission restraint control of packets for which sampling can be performed. Also, by this operation, it is possible to decrease load on the controller 200.

The exemplary embodiment of the present invention has been described above, however, the present invention is not limited to the above exemplary embodiment and further modifications, replacements, and adjustments can be added within the scope of the basic technological concept of the present invention. For example, the configurations of the networks shown in respective drawings, the configurations of respective elements and representation of messages are merely used as examples to facilitate understanding of the present invention, not to limit the present invention to the illustrated modes.

As the end of the explanation, preferred modes of the present invention will be abstracted.

(Mode 1)
See the communication apparatus according to the above first aspect.

(Mode 2)
The communication apparatus according to mode 1, wherein, as the predetermined transmission restraint control, the communication apparatus performs rate control of limiting transmission amounts during a predetermined period, or performs packet dropping control based on a specified rule.

(Mode 3)
The communication apparatus according to mode 1 or 2, wherein a target packet for the predetermined transmission restraint control is specified as a matching condition corresponding to control information specified by the control apparatus; and contents of the predetermined transmission restraint control is described as processing contents applied to a packet that is applied to the matching condition corresponding to the control information.

(Mode 4)
See the control apparatus according to the above second aspect.

(Mode 5)
See the communication apparatus according to the above third aspect.

(Mode 6)
See the received packet processing method according to the above fourth aspect.
(Mode 7)
See the communication apparatus control method according to the above fifth aspect.
(Mode 8)
See the non-transitory computer readable recording medium storing the program according to the above sixth aspect.
Further, Modes 4 to 8 can be developed into derivative modes as Modes 2 and 3.

The disclosure of each of the above Patent Literatures and Non-Patent Literatures is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including each element in each claim, exemplary embodiment, example, drawing, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

100-1 to 100-N, 100 OpenFlow switch (OFS)
100A communication apparatus
110, 110A packet processing unit
120 control unit
130 reception unit
140 transmission unit
190 aggregation switch
200 controller
200A control apparatus
210 transmission restraint control contents receiving unit
220 flow entry setting unit
221 OFS management database (OFS management DB)
300 terminal
301 server

The invention claimed is:

1. A communication apparatus, comprising:
a packet reception notifying controller configured to transmit a packet reception notification to a control apparatus when predetermined packets have been received; and
a packet processor configured to:
receive a packet;
match the received packet to a flow entry among one or more flow entries, the one or more flow entries including: (1) matching conditions for matching received packets to the one or more flow entries; and (2) corresponding processing content for processing the matched packets, the processing content including control content indicating whether to restrain transmission of a packet reception notification for the matched packets, wherein the one or more flow entries are generated by the control apparatus based on input from a management apparatus; and
process the received packet based on the processing content of the matched flow entry, the processing including controlling the packet reception notifying controller to restrain transmission of the packet reception notification for the received packet to the control apparatus when the control content of the matched flow entry indicates to restrain transmission of the packet reception notification.

2. The communication apparatus according to claim 1, wherein the control content of the one or more flow entries indicates whether to perform rate control of limiting transmission amounts during a predetermined period or to perform packet dropping control based on a specified rule for the matching packets.

3. A control apparatus, adapted to communicate with a communication apparatus(es), the communication apparatus(es) comprising:
a packet reception notifying controller configured to transmit a packet reception notification to the control apparatus when predetermined packets have been received; and
a packet processor configured to:
receive a packet;
match the received packet to a flow entry among one or more flow entries, the one or more flow entries including: (1) matching conditions for matching received packets to the one or more flow entries; and (2) corresponding processing content for processing the matched packets, the processing content including control content indicating whether to restrain transmission of the packet reception notification for the matched packets; and
process the received packet based on the processing content of the matched flow entry, the processing including controlling the packet reception notifying controller to restrain transmission of the packet reception notification for the received packet to the control apparatus when the control content of the matched flow entry indicates restrain transmission of the packet reception notification, and
wherein the control apparatus comprising:
a generator for generating, according to an Input from a management apparatus, the one or more flow entries, and for notifying the one or more flow entries to the communication apparatus(es),
wherein, the communication apparatus(es) transmits the packet reception notification indicating that the predetermined packets have been received,
the processing contents include control contents for transmission restraint of the packet reception notification from the communication apparatus(es), and
the control apparatus causes the communication apparatus(es) to restrain, according to the control contents, transmission of the packet reception notification indicating a packet that matches the matching condition has been received.

4. The control apparatus according to claim 3,
wherein the control apparatus causes the communication apparatus(es) to restrain transmission of the packet reception notification by notifying to the communication apparatus(es) so that the communication apparatus(es) performs rate control of limiting transmission amounts during a predetermined period, or performs packet dropping control based on a specified rule.

5. A communication system, comprising:
a communication apparatus(es), the communication apparatus(es) comprising:
a packet reception notifying controller configured to transmit a packet reception notification to a control apparatus when predetermined packets have been received; and a packet processor configured to:
  receive a packet;
  match the received packet to a flow entry among one or more flow entries, the one or more flow entries including: (1) matching conditions for matching received packets to the one or more flow entries; and (2) corresponding processing content for processing the matched packets, the processing content including control content indicating whether to restrain transmission of a packet reception notification for the matched packets, wherein the one or more flow entries are generated by the control apparatus based on input from a management apparatus; and
  process the received packet based on the processing content of the matched flow entry, the processing including controlling the packet reception notifying controller to restrain transmission of the packet reception notification for the received packet to the control apparatus when the control content of the matched flow entry indicates to restrain transmission of the packet reception notification, and
wherein the control apparatus comprising:
a generator for generating, according to an input from a management apparatus, the one or more flow entries, and for notifying the one or more flow entries to the communication apparatus(es),
wherein, the processing contents include control contents for transmission restraint of packet reception notification from the communication apparatus(es), and
the control apparatus causes the communication apparatus(es) to restrain, according to the control contents, transmission of the packet reception notification indicating a packet that matches the matching condition has been received.

6. A received packet processing method comprising:
processing a packet received according to a flow entry(ies), generated by a control apparatus according to an input from a management apparatus, that includes a matching condition and a processing contents for a packet that matches the matching condition;
transmitting to the control apparatus a packet reception notification, wherein the packet reception notification indicates that a predetermined packet has been received, wherein the processing contents include control contents for transmission restraint of packet reception notification; and
restraining, according to the control contents, transmission of the packet reception notification indicating a packet that matches the matching condition has been received.

7. A communication apparatus control method comprising:
generating, according to an input from a management apparatus, a flow entry(ies) including a matching condition and a processing contents for a packet that matches the matching condition;
notifying the flow entry(ies) to a communication apparatus(es), wherein the processing contents include control contents for transmission restraint of packet reception notification; and
causing the communication apparatus(es) to restrain, according to the control contents, transmission of the packet reception notification indicating a packet that matches the matching condition has been received.

8. A non-transitory computer readable storage medium storing a program that, when executed by a processor of a communication apparatus(es), causes the processor to perform a method comprising:
processing a packet received according to a flow entry(ies), generated by a control apparatus according to an input from a management apparatus, that includes a matching condition and a processing contents for a packet that matches the matching condition;
transmitting to the control apparatus a packet reception notification, wherein the packet reception notification indicates that a predetermined packet has been received, wherein the processing contents include control contents for transmission restraint of packet reception notification; and
restraining, according to the control contents, transmission of the packet reception notification indicating a packet that matches the matching condition has been received.

* * * * *